(12) United States Patent
Lo

(10) Patent No.: US 12,460,795 B2
(45) Date of Patent: Nov. 4, 2025

(54) ELECTRONIC DEVICE AND MANUFACTURING METHOD THEREOF

(71) Applicant: CARUX TECHNOLOGY PTE. LTD., Singapore (SG)

(72) Inventor: Ching-I Lo, Tainan (TW)

(73) Assignee: CARUX TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 18/512,412

(22) Filed: Nov. 17, 2023

(65) Prior Publication Data

US 2024/0210014 A1  Jun. 27, 2024

Related U.S. Application Data

(60) Provisional application No. 63/477,236, filed on Dec. 27, 2022.

(30) Foreign Application Priority Data

Sep. 8, 2023  (CN) .......................... 202311159459.1

(51) Int. Cl.
*F21V 19/00* (2006.01)
*G02F 1/1333* (2006.01)

(52) U.S. Cl.
CPC ........ *F21V 19/00* (2013.01); *G02F 1/133308* (2013.01); *G02F 1/133314* (2021.01); *G02F 1/133317* (2021.01); *G02F 1/133322* (2021.01); *G02F 1/133325* (2021.01)

(58) Field of Classification Search
CPC ...................... G02F 1/133317; G02F 1/133322
See application file for complete search history.

(56) References Cited

U.S. PATENT DOCUMENTS

| | | | |
|---|---|---|---|
| 10,788,707 B2 | 9/2020 | Ai et al. | |
| 12,140,830 B2* | 11/2024 | Kil | G02B 6/005 |
| 12,248,212 B2* | 3/2025 | Kang | G02F 1/133317 |
| 2014/0133073 A1* | 5/2014 | Ahn | G02F 1/133305 |
| | | | 361/679.01 |
| 2015/0277179 A1* | 10/2015 | Nishi | G02F 1/1335 |
| | | | 349/58 |
| 2016/0054614 A1* | 2/2016 | Choi | G02F 1/133608 |
| | | | 349/58 |
| 2016/0223738 A1* | 8/2016 | Liu | G02B 6/0088 |

(Continued)

FOREIGN PATENT DOCUMENTS

| CN | 107329301 B | 10/2020 |
|---|---|---|
| KR | 102275251 B1 * | 7/2021 |

OTHER PUBLICATIONS

Machine translation of KR-102275251-B1, published Jul. 12, 2021 (Year: 2021).*

*Primary Examiner* — William N Harris
(74) *Attorney, Agent, or Firm* — McClure, Qualey & Rodack, LLP

(57) ABSTRACT

An electronic device is provided, including a curved backlight module, a display module, a fixing member, and a glue. The curved backlight module includes a curved back plate. The display module is disposed on the curved backlight module. The fixing member is disposed between the curved backlight module and the display module. The glue adheres the fixing member and the display module, and the fixing member is configured to affix the display module to the curved back plate.

18 Claims, 8 Drawing Sheets

(56) References Cited

U.S. PATENT DOCUMENTS

2016/0259203 A1* 9/2016 Nishimoto ........ G02F 1/133308
2016/0291242 A1* 10/2016 An .................... G02F 1/133308
2018/0157092 A1* 6/2018 Jung ................. B32B 17/10036
2019/0227368 A1* 7/2019 Sim ................... G02F 1/133308

* cited by examiner

A-A

B-B

ELECTRONIC DEVICE AND MANUFACTURING METHOD THEREOF

CROSS REFERENCE TO RELATED APPLICATIONS

This application claims the benefit of U.S. Provisional Application No. 63/477,236, filed Dec. 27, 2022, and China Patent Application No. 202311159459.1, filed Sep. 8, 2023, the entirety of which are incorporated by reference herein.

BACKGROUND OF THE DISCLOSURE

Field of the Disclosure

The application relates in general to an electronic device and a manufacturing method thereof, and in particular, to a curved display and a manufacturing method thereof.

Description of the Related Art

Recently, research indicates that a curved screen can reduce interference by external light and improve contrast. A user can comfortably watch images on the curved screen, and the images on the curved screen are not deformed or distorted. Thus, many different products with curved screens have been released. How to reduce the difficulty of the manufacture and the assembly of the curved screen and the time of production has become an important issue.

BRIEF SUMMARY OF DISCLOSURE

An embodiment of the disclosure provides an electronic device, including a curved backlight module, a display module, a fixing member, and a glue. The curved backlight module includes a curved back plate. The display module is disposed on the curved backlight module. The fixing member is disposed between the curved backlight module and the display module. The glue adheres the fixing member and the display module, and the fixing member is configured to affix the display module to the curved back plate.

An embodiment of the disclosure also provides a manufacturing method of an electronic device, including: providing a curved back light module comprising a curved back plate with a first curvature, providing a fixing member, and disposing a display module with a second curvature on the curved back plate by using the fixing member. The first curvature is larger than the second curvature.

BRIEF DESCRIPTION OF DRAWINGS

The disclosure can be more fully understood by reading the subsequent detailed description and examples with references made to the accompanying drawings, wherein.

DETAILED DESCRIPTION OF DISCLOSURE

Figure 1:
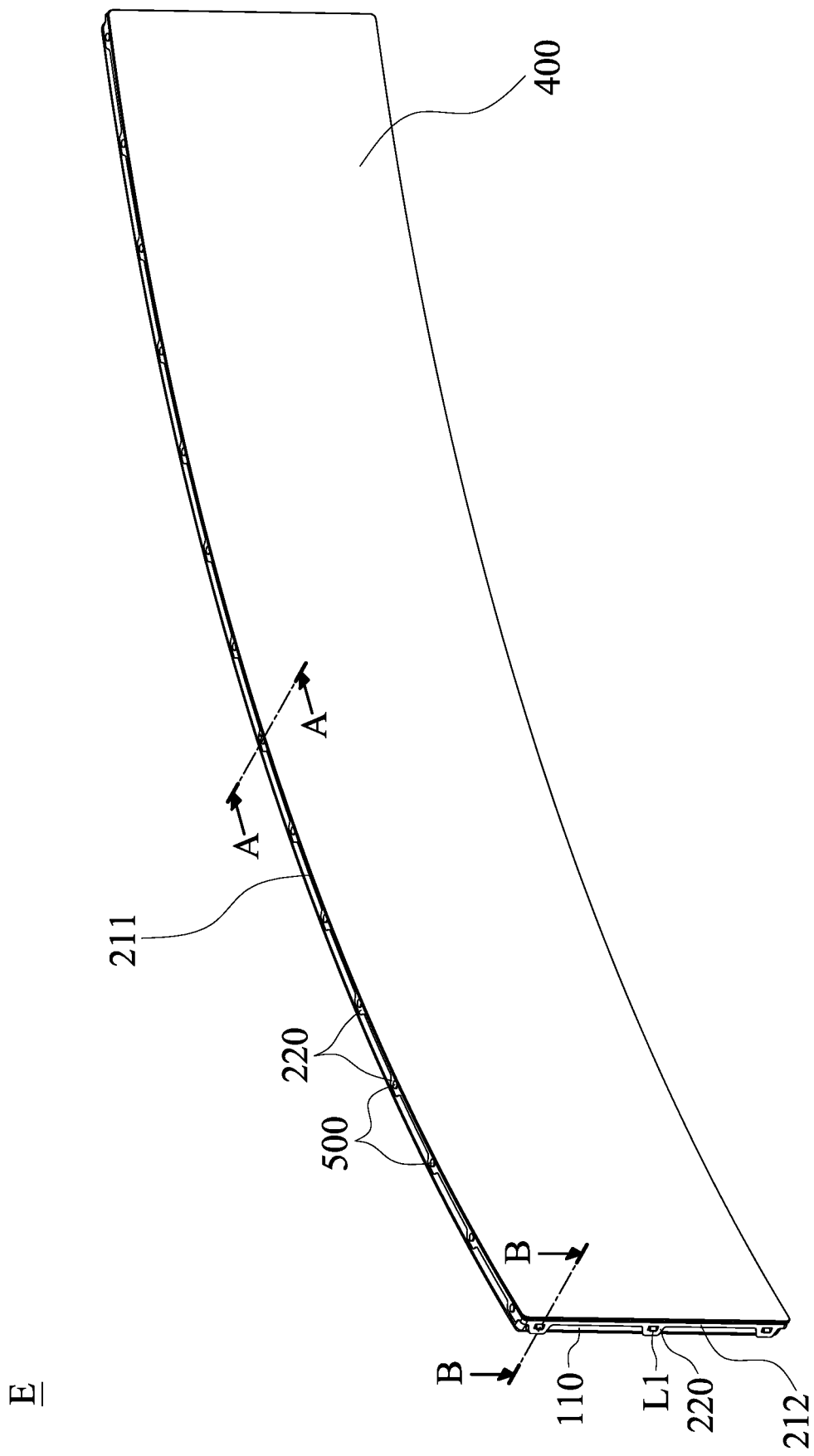
FIG. 1 is a schematic diagram of an electronic device according to an embodiment of the disclosure.

The making and using of the embodiments of the electronic device and the manufacturing method thereof are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include", "comprise" and "have" are used in an open-ended fashion, and thus should be interpreted to mean "include, but not limited to . . . ". Thus, when the terms "include", "comprise" and/or "have" are used in the description of the present disclosure, the corresponding features, areas, steps, operations and/or components would be pointed to existence, but not limited to the existence of one or a plurality of the corresponding features, areas, steps, operations and/or components.

In addition, in this specification, relative expressions are used. For example, "below" and "above" are used to describe the position of one element relative to another. It should be appreciated that if a device is flipped upside down, an element that is "below" will become an element that is "above".

When the corresponding component (such as layer or area) is referred to "on another component (or the variant thereof)", it may be directly on another component, or other component may exist between them. On the other hand, when the component is referred to "directly on another component (or the variant thereof)", any component does not exist between them. Moreover, when a component is referred to "on another component (or the variant thereof)", the component and the other component has a positional relationship in a top view direction, the component can be disposed above or below the other component, and the positional relationship is based on the orientation of the device.

In some embodiments of the disclosure, terms concerning attachments, coupling and the like, such as "connected", refer to a relationship wherein structures are secured or attached to one another either directly or indirectly through intervening structures, unless expressly described otherwise.

It should be understood that, although the terms "first", "second", etc. can be used herein to describe various elements, layers and/or sections, these elements, layers and/or sections should not be limited by these terms. These terms are only used to distinguish one element layer or section from another element, layer or section. Thus, a first element, layer or section discussed below could be termed a second element, layer or section without departing from the teachings of the present disclosure. For brevity, the terms "first", "second", etc. may not be used in the specification. The first element and/or the second element in claims can refer to any element that meets the description in the specification without departing from the spirit and scope of the invention as defined by the appended claims.

The terms "about" and "substantially" typically mean +/−15% of the stated value, for example, +/−10%, +/−5%, +/−3%, +/−2%, +/−1%, or +/−0.5% of the stated value. The stated value of the present disclosure is an approximate value. When there is no specific description to the terms "about" and "substantially", the stated value includes the meaning of "about" or "substantially". Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise. Moreover, for brevity, some elements can be suitably omitted in the figures.

The electronic device can include a display device, a backlight device, an antenna device, a sensing device, a tiled device, or the combination thereof, but it is not limited thereto. The display device can be a non-self-emitting type display device or a self-emitting type display device. The antenna device can be a liquid crystal type antenna device or a non-liquid crystal type antenna device, the sensing device can be a sensing device for sensing capacitance, light, heat, or ultrasonic, but it is not limited thereto. The electronic device can include a passive element and an active element, such as a capacitance, a resistance, an inductance, a diode, a transistor, or etc. The diode can include a light-emitting diode or a photoelectric diode. For example, the light-emitting diode can include an organic light-emitting diode (OLED), a mini LED, a micro LED, or a quantum dot LED, but it is not limited thereto. The tiled device can be a tiled display device or a tiled antenna device, but it is not limited thereto. It should be noted that, the electronic device can be a combination having one or more aforementioned devices, but it is not limited thereto. The following description takes the display device as an example, but it is not limited thereto.

Figure 2:
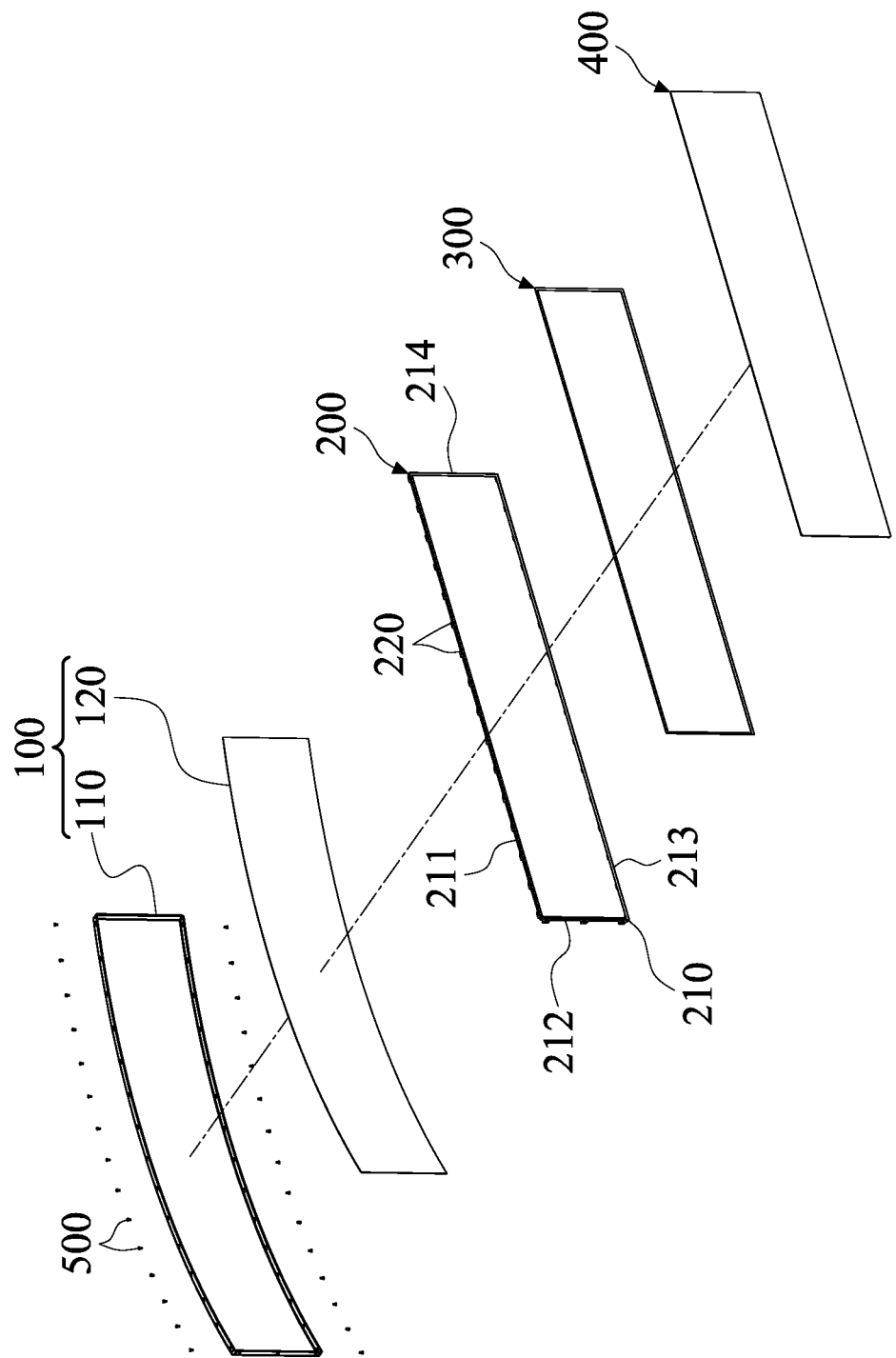
FIG. 2 is an exploded-view diagram of the electronic device according to an embodiment of the disclosure.

FIG. 1 is a schematic diagram of an electronic device E according to an embodiment of the disclosure, and FIG. 2 is an exploded-view diagram of the electronic device E. Referring to FIG. 1 and FIG. 2, the electronic device E of the present disclosure can be a curved display, which primarily includes a curved backlight module 100, a fixing member 200, a glue 300, a display module 400, and a plurality of locking members 500. The display module 400 substantially includes a plane structure, and can be affixed to the curved backlight module 100 via the fixing member 200 and the glue 300. For example, the electronic device E can be applied to the public information display (PID), the television, the monitor, the tablet computer, the smart phone, the smart watch, the in-vehicle display, but it is not limited thereto.

The curved backlight module 100 includes a curved back plate 110 and a backlight module unit 120. The curved back plate 110 surrounds the backlight module unit 120 for protecting the backlight module unit 120 from the damage due to the impact of the external component(s). The backlight module unit 120 can be a direct-type backlight or a side-light type backlight, and can include a light emitting member, a light guiding plate, a reflector, a diffuser, and/or a prism sheet, but it is not limited thereto. The light emitting member in the backlight module unit 120 can include a light-emitting diode (LED), a fluorescent lamp (such as a cold cathode fluorescent lamp (CCFL), a fluorescence, a phosphor, or other suitable type light emitting member). The light-emitting diode can include an inorganic light-emitting diode, an organic light-emitting diode (OLED), a mini LED, a micro LED, a quantum dots light-emitting diode (QLED or QD-LED), other suitable light-emitting diode, or a combination thereof, but it is not limited thereto.

Figure 3:
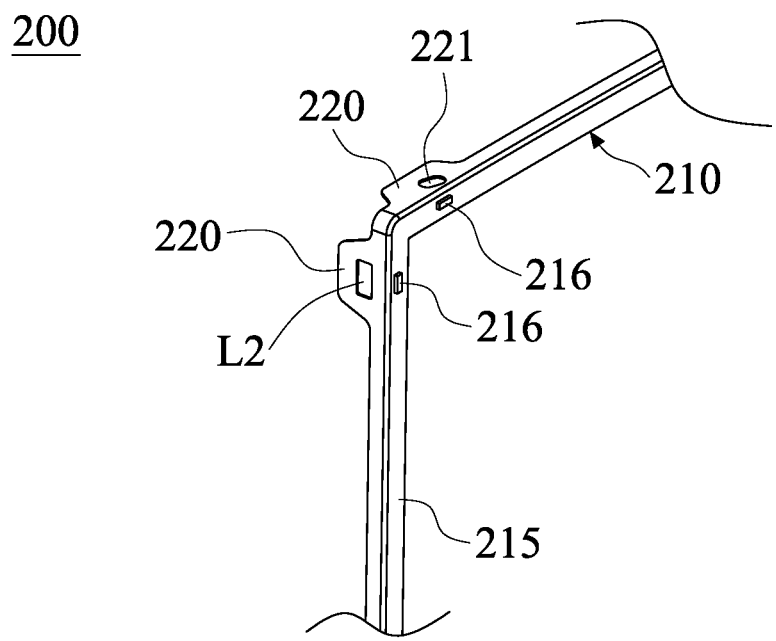
FIG. 3 is a partial schematic diagram of a fixing member according to an embodiment of the disclosure.
Figure 4A:
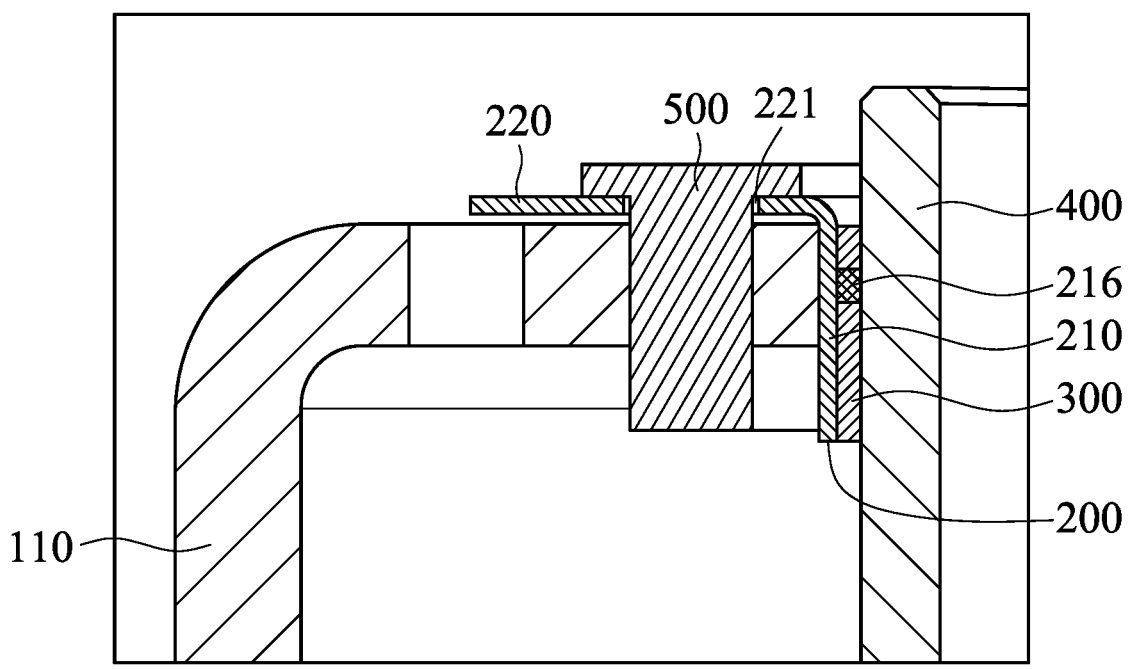
FIG. 4A is a cross-sectional view taken along the line A-A in FIG. 1.
Figure 4B:
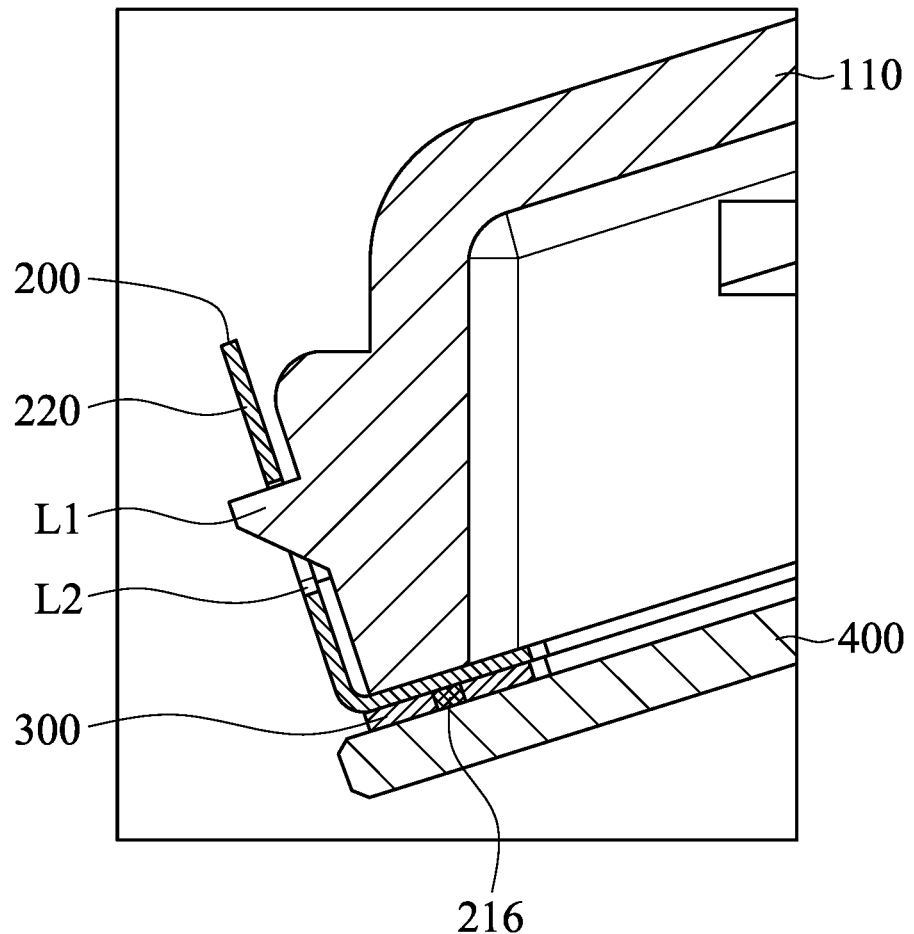
FIG. 4B is a cross-sectional view taken along the line B-B in FIG. 1.

FIG. 3 is a partial schematic diagram of the fixing member 200, FIG. 4A is a cross-sectional view taken along the line A-A in FIG. 1, and FIG. 4B is a cross-sectional view taken along the line B-B in FIG. 1. As shown in FIG. 1 to FIG. 4B, the fixing member 200 includes a main body 210 and a plurality of fixing portions 220. In this embodiment, the main body 210 substantially is a hollow rectangular, and has a first side 211, a second side 212, a third side 213, and a fourth side 214. The first side 211 and the third side 213 are disposed between and connected to the second side 212 and the fourth side 214, and the first side 211 and the third side 213 are substantially perpendicular to the second side 212 and the fourth side 214.

The fixing portions 220 are connected to the main body 210, and are arranged at equal intervals on each side. In this embodiment, each of the fixing portions 220 on the first side 211 and the third side 213 has a through hole 221 corresponding to the locking member 500, and each of the fixing portions 220 on the second side 212 and the fourth side 214 has a second latch mechanism L2 corresponding to a first latch mechanism L1 of the curved back plate 110. The locking member 500 can pass the through hole 221 of the fixing portion 220 and connect to the curved back plate 110 to affix the first side 211 and the third side 213 of the fixing member 200 to the curved back plate 110. The first latch mechanism L1 on the curved back plate 110 can be engaged with the second latch mechanism L2 of the fixing portion 220 to affix the second side 212 and the fourth side 214 to the curved back plate 110. Therefore, the fixing portions 220 can be steadily affixed to the curved back plate 110. In some embodiments, the fixing portions 220 can be arranged at unequal intervals in at least one side of the multiple sides of the fixing member 200. For example, the fixing portions 220 can be arranged at unequal intervals in the first side 211, and arranged at equal intervals in the second side 212, the third side 213, and the fourth side 214, but it is not limited thereto.

For example, the locking members 500 can be the screws or the plugs, the first latch mechanisms L1 can be the protrusions, and the second latch mechanisms can be the recesses, but it is not limited thereto. In some embodiments, the first latch mechanisms L1 can be the recesses, and the second latch mechanisms can be the protrusions.

As shown in FIG. 1, when the fixing member 200 is assembled on the curved back plate 110, the fixing member 200 matches the shape of the curved back plate. That is, the curvature of the first side 211 and/or the third side 213 is greater than the curvature of the second side 212 and/or the fourth side 214. In the aforementioned electronic device E, since the position with large curvature is affixed via the locking members 500, the position with small curvature are engaged by the first latch mechanisms L1 and the second latch mechanisms L2, and the number and/or the density of the fixing portions 220 at the first side 211 and/or the third side 213 is larger than the number and/or the density of the fixing portions 220 at the second side 212 and/or the fourth side 214, it can combine the reliability and convenience of the assembly.

In some embodiments, all of the first side 211, the second side 212, the third side 213, and the fourth side 214 can be affixed via the locking members 500. In some embodiments, all of the first side 211, the second side 212, the third side 213, and the fourth side 214 can be affixed via the first latch mechanisms L1 and the second latch mechanisms L2.

The glue 300 is disposed between the display module 400 and the fixing member 200, and is in contact with the display module 400 and the surface 215 of the main body 210 facing away the curved backlight module 100. Therefore, the display module 400 can be adhered on the surface 215 of the fixing member 200 via the glue 300. Since the fixing member 200 matches the shape of the curved back plate 110 when the fixing member 200 is assembled on the curved back plate 110, the display module 400 adhered on the fixing member 200 also matches the shape of the curved back plate 110 and creates the same or similar curvature.

In this embodiment, the main body 210 has one or more protruding portions 216 protruding from the surface 215. When the electronic device E is assembled, the height of each of the protruding portions 216 is larger than or equal to the height of the glue 300. Therefore, the user can control the height of the glue 300 by the protruding portions 216, and the range of the glue 300 overflowing from the fixing member 200 can be reduced or the whole height of the electronic device E can be controlled. For example, the thickness of each of the protruding portions 216 can be ranged from 0.05 millimeter (mm) to 2 millimeter (such as 0.4 millimeter), but it is not limited thereto.

Figure 5:
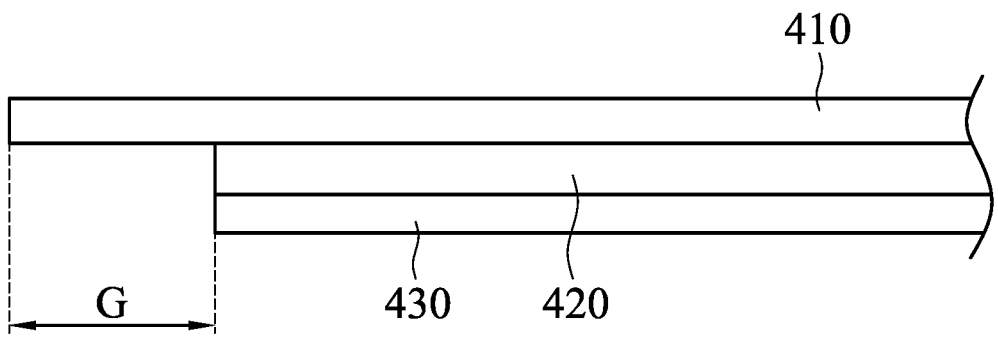
FIG. 5 is a schematic diagram of a display module according to an embodiment of the disclosure.

Referring to FIG. 5, the display module 400 includes a cover plate 410, an adhesive member 420, and a display panel 430. The adhesive member 420 is disposed between the cover plate 410 and the display panel 430 to adhere the cover plate 410 to the display panel 430. For example, the adhesive member 420 can be an optical clear adhesive (OCA), but it is not limited thereto. The material of the cover plate 410 can include glass, polyimide (PI), polyethylene terephthalate (PET), or other suitable material, but it is not limited thereto. It should be noted that, the width of the adhesive member 420 and the width of the display panel 430 can be less than the width of the cover plate 410, so that a gap G can be formed between the edges of the adhesive member 420 and the display panel 430 and the edge of the cover plate 410. The glue 300 can adhere the cover plate 410 inside the gap G, and the glue 300 and/or the fixing member 200 can be accommodated in the gap G. Therefore, the adherence between the glue 300 and the cover plate 410 does not influence the circuit inside the display panel 430. In this embodiment, the width of the gap G can be ranged from 0.3 millimeter to 30 millimeter, but it is not limited thereto.

Figure 6A:
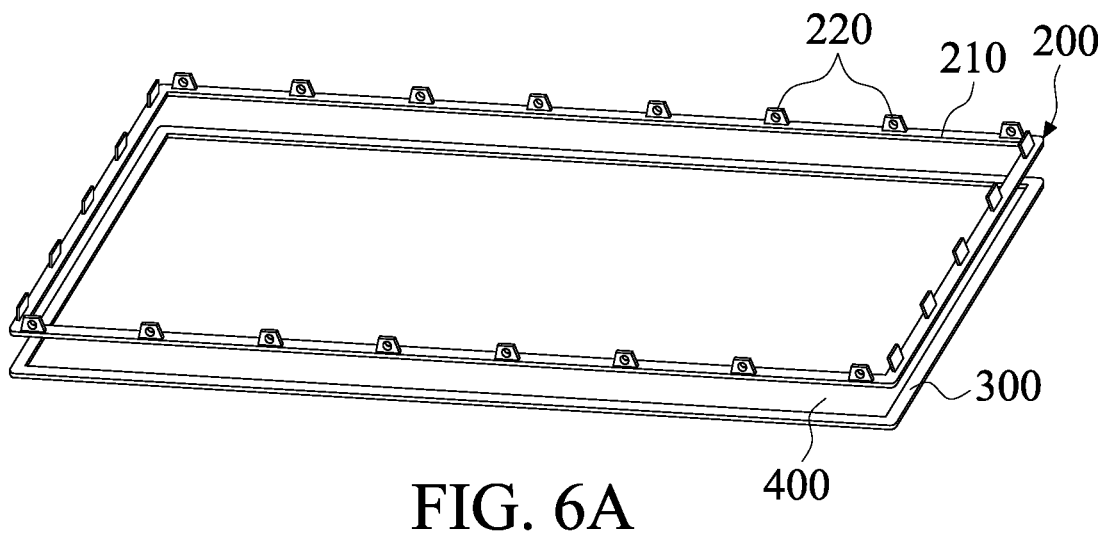
FIG. 6A is a schematic diagram representing that a glue is coated on the display module according to an embodiment of the disclosure.

The manufacturing method of the electronic device E is discussed below. As shown in FIG. 6A, first, the glue 300 can be coated on the display module 400. In detail, the glue 300 can be coated on the cover plate 410 of the display module 400 in the gap G. In some embodiments, the glue 300 can be coated on the fixing member 200 rather than the display module 400. More in detail, the glue 300 can be coated on the surface 215 of the main body 210 of the fixing member 200.

Figure 6B:
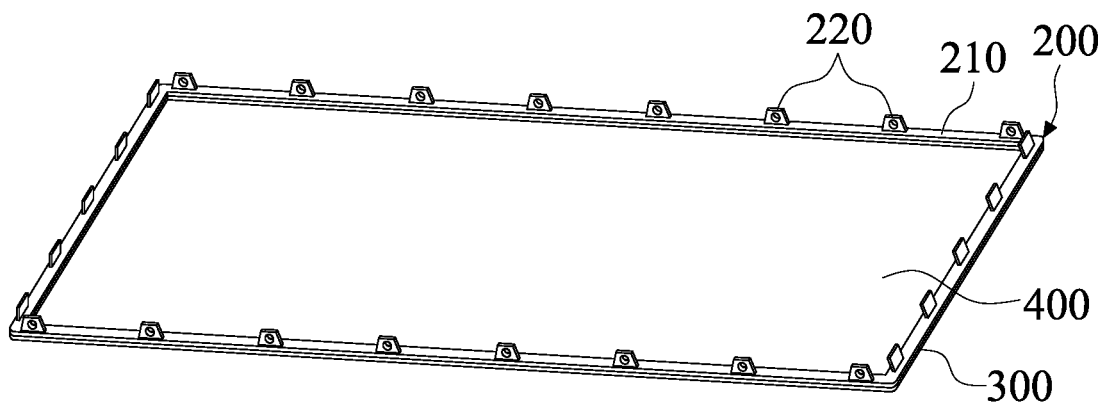
FIG. 6B is a schematic diagram representing that a fixing member is pressed onto the glue according to an embodiment of the disclosure.

As shown in FIG. 6B, subsequently, the user can press the fixing member 200 onto the display module 400. When the glue 300 is coated on the display module 400, the fixing member 200 is pressed onto the glue 300, so that the glue 300 can adhere the fixing member 200 to the display module 400. When the glue 300 is coated on the fixing member 200, the glue 300 can be in contact with the fixing member 200 and the display module 400 because the fixing member 200 with the glue 300 is pressed to the display module 400. Thus, the glue 300 also can adhere the fixing member 200 to the display module 400.

It should be noted that, besides the adherence, the glue 300 can further provide as a buffer when pressing to reduce the possibility of the damage from the impact between the fixing member 200 and the display module 400 in assembly.

Figure 6C:
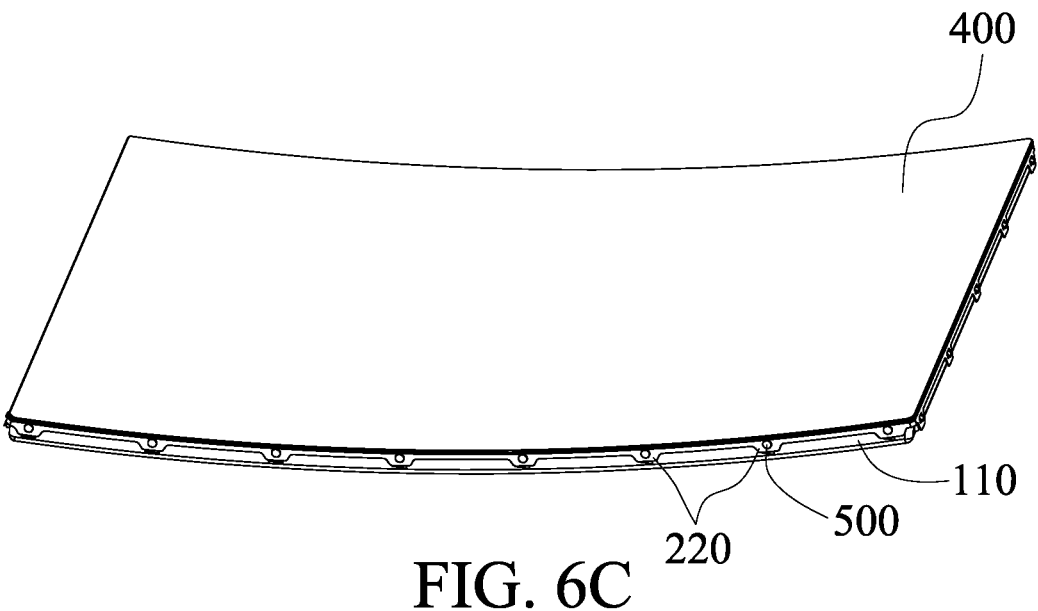
FIG. 6C is a schematic diagram representing that the display module is affixed to a curved backlight module via the fixing member according to an embodiment of the disclosure.

Finally, as shown in FIG. 6C, the fixing member 200 can be affixed to the curved back plate 110 via the locking members 500 and/or the first and second latch mechanisms L1 and L2. It should be noted that, when the curved backlight module 100 and the display module 400 are separated, the curved back plate 110 has a first curvature, and the display module 400 has a second curvature which is less than the first curvature. When the fixing member 200 is affixed to the curved back plate 110, the curvature of the display module 400 adhered on the fixing member 200 is changed from the second curvature to the first curvature. The second curvature can be larger than or equal to zero, for example (in this embodiment, the second curvature is substantially equal to zero).

By using the aforementioned steps, the manufacturing of the electronic device E can be accomplished.

Figure 7:
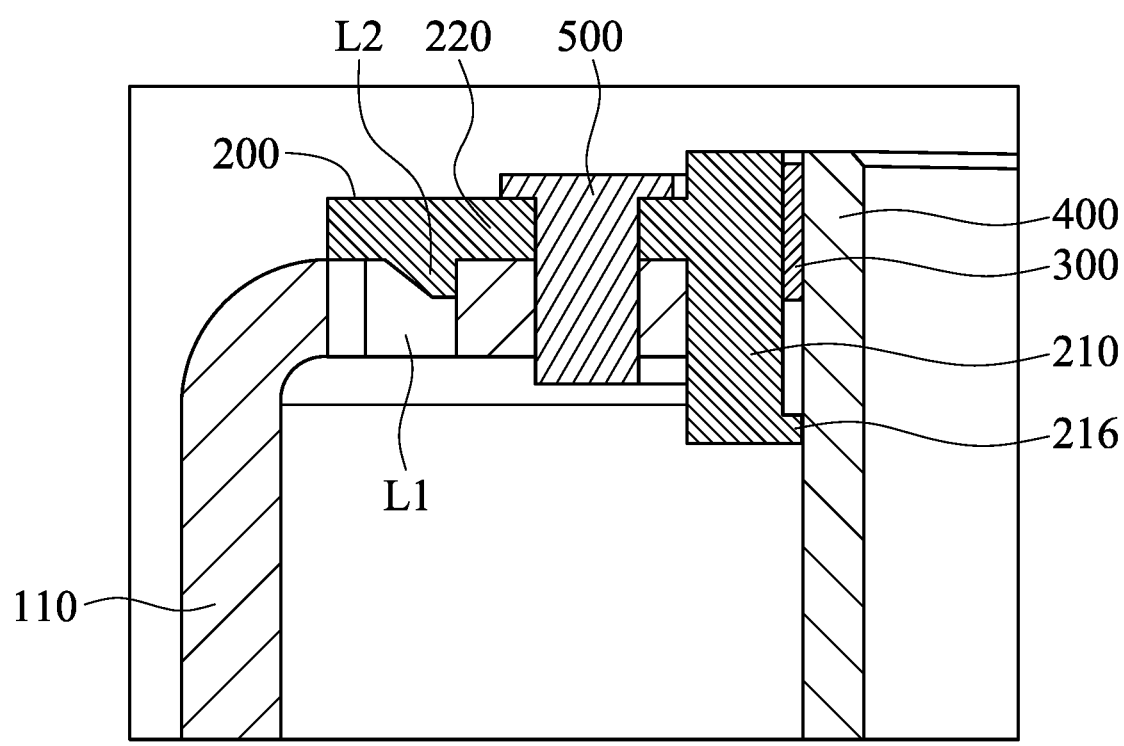
FIG. 7 is a cross-sectional view of an electronic device according to another embodiment of the disclosure.

Referring to FIG. 7, in some embodiments of the present disclosure, each of the fixing portions 220 of the fixing member 200 can be affixed to the curved back plate 110 via the locking member 500 and the first and second latch mechanisms L1 and L2 simultaneously. The fixing portion 220 of this fixing member 200 can have through hole 211 and second latch mechanism L2 simultaneously, and the through hole 221 can be disposed between the second latch mechanism L2 and the main body 210. When the user uses the fixing portions 220 to affix the fixing member 200 to the curved back plate 110, the second latch mechanisms L2 can be engaged with the first latch mechanisms L1 of the curved back plate 110 firstly, and then the locking members 500 can pass the through holes 221 and connect the curved back plate 110 in the position that requires enhancing the securing force (such as the fixing portions 220 on the side with large curvature). Thus, the affixing of the fixing member 200 is accomplished.

Figure 8A:
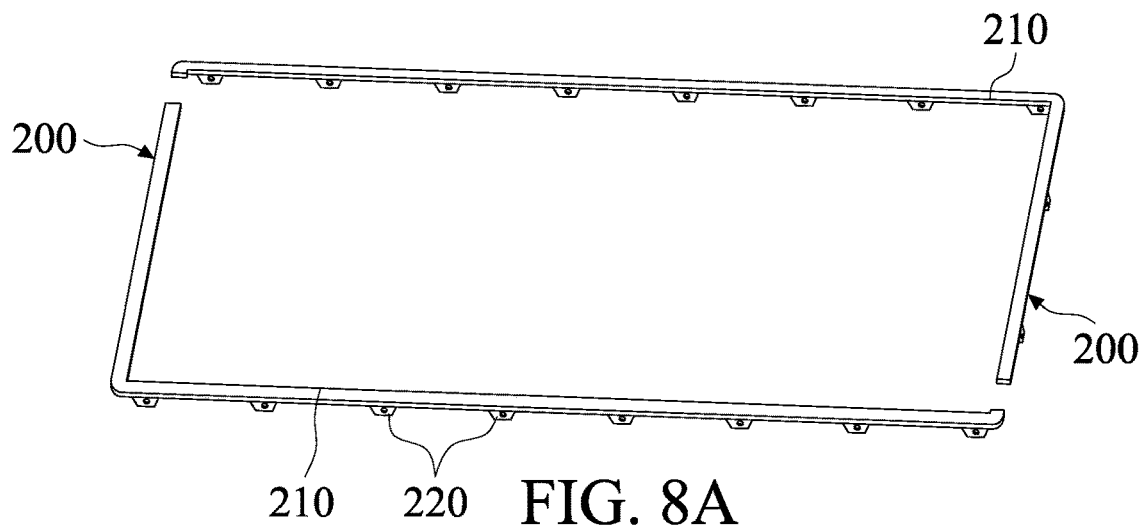
FIG. 8A is a schematic diagram of the fixing members according to another embodiment of the disclosure.
Figure 8B:
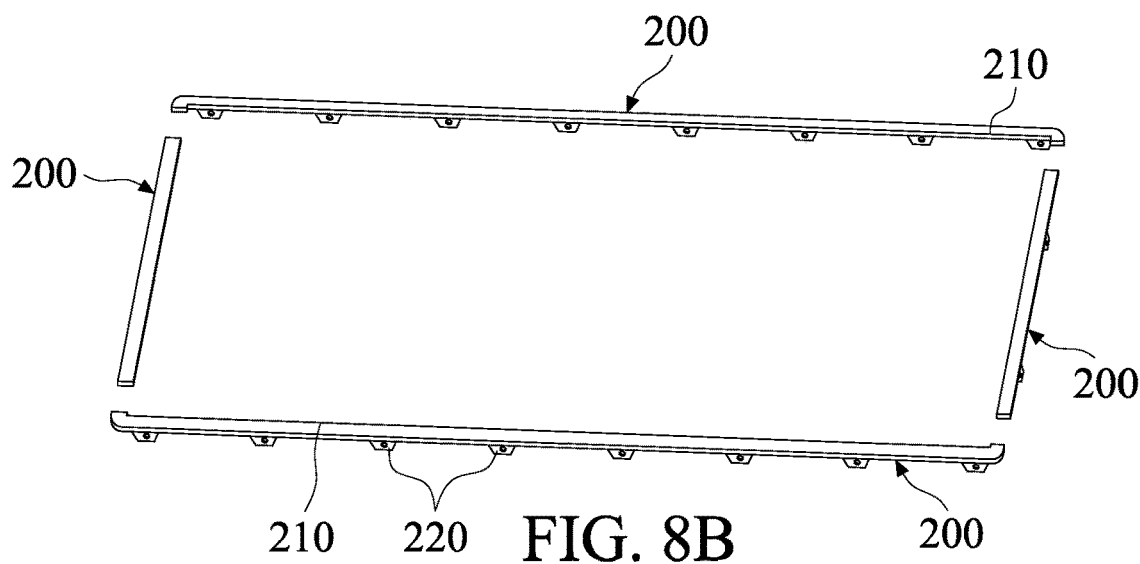
FIG. 8B is a schematic diagram of the fixing members according to another embodiment of the disclosure.
Figure 8C:
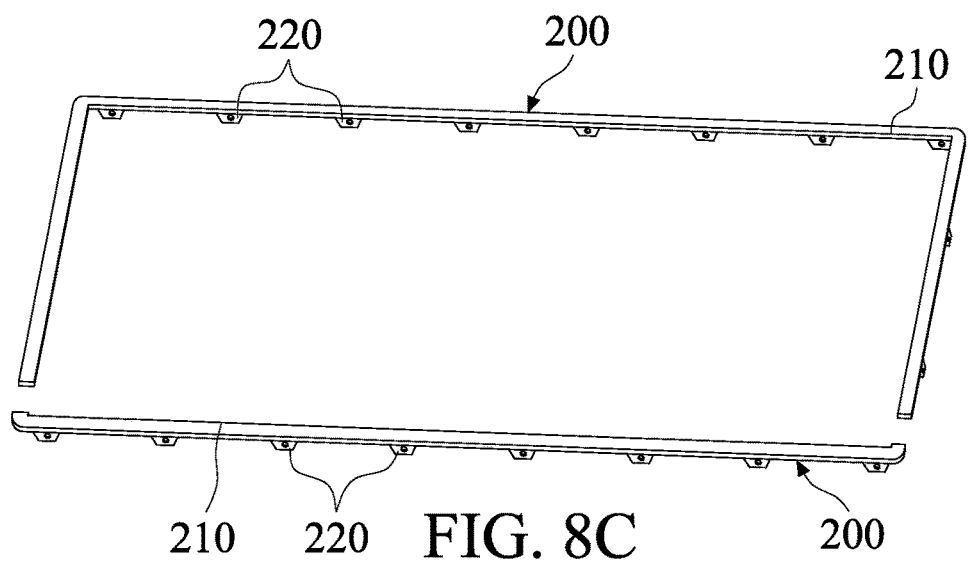
FIG. 8C is a schematic diagram of the fixing members according to another embodiment of the disclosure.

In the aforementioned embodiments, the electronic device E includes the single fixing member 200 and the fixing member 200 substantially is the hollow rectangular, however, it is not limited thereto. For example, as shown in FIG. 8A, FIG. 8B, and FIG. 8C, the electronic device E can include a plurality of fixing members 200. In the embodiment of FIG. 8A, each fixing member 200 substantially has a L-shaped structure. In the embodiment of FIG. 8B, each fixing member 200 has a longitudinal structure. In the embodiment of FIG. 8C, one of the fixing members 200 has a C-shaped structure, and another one of the fixing members 200 has a longitudinal structure.

Figure 8D:
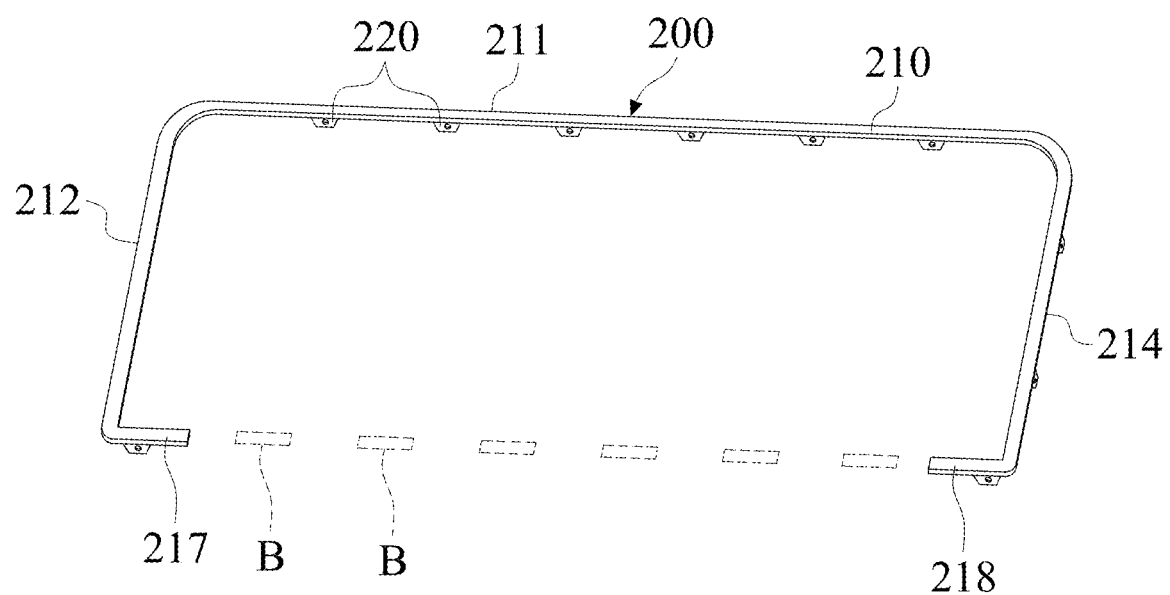
FIG. 8D is a schematic diagram of the fixing members according to another embodiment of the disclosure.

Referring to FIG. 8D, in some embodiments, the electronic device E includes the single fixing member 200. This fixing member 200 has a first side 211, a second side 212, and a fourth side 214. The opposite ends of the first side 211 are respectively connected to the second side 212 and the fourth side 214. The end of the second side 212 that is not connected to the first side 211 is connected to an extending section 217, the extending section 217 is extended toward the fourth side 214, and the length of the extending section 217 is less than the length of the first side 211. The end of the fourth side 214 that is not connected to the first side 211 is connected to an extending section 218, the extending section 218 is extended toward the second side 212, and the length of the extending section 218 is less than the length of the first side 211. Therefore, a gap is formed between the extending section 217 and the extending section 218. The circuit board B (such as the flexible printed circuit (FPC)) of the curved backlight module 100 and/or the display module 400 can be accommodated in this gap, so as to facilitate the electronic device E to have different shape and reduce the difficulty of the assembly process. It should be noted that, the circuit board B of the curved backlight module 100 and/or the display module 400 is separated from the extending sections 217 and 218 and is not in contact with the extending sections 217 and 218, so that the possibility of the short circuit can be reduced.

Moreover, in this embodiment, the connecting portion between the first side 211 and the second side 212 and/or the connecting portion between the first side 211 and the fourth side 214 can include arc structures to enhance the safety in the transport or the usage.

The features between the aforementioned embodiments can be used or combined as long as they do not violate or conflict the spirit of the present application.

In summary, an embodiment of the disclosure provides an electronic device, including a curved backlight module, a display module, a fixing member, and a glue. The curved backlight module includes a curved back plate. The display module is disposed on the curved backlight module. The fixing member is disposed between the curved backlight module and the display module. The glue adheres the fixing member and the display module, and the fixing member is configured to affix the display module to the curved back plate.

An embodiment of the disclosure also provides a manufacturing method of an electronic device, including: providing a curved back light module comprising a curved back plate with a first curvature, providing a fixing member, and disposing a display module with a second curvature on the curved back plate by using the fixing member. The first curvature is larger than the second curvature.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the disclosure has been described by way of example and in terms of preferred embodiment, it should be understood that the disclosure is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An electronic device, comprising:
a curved backlight module, comprising a curved back plate;
a display module, disposed on the curved backlight module and comprising an inner surface facing the curved backlight module;
a fixing member, comprising at least one protruding portion that is in contact with the inner surface;
a glue, adhering the fixing member to the display module, wherein the fixing member is configured to affix the display module to the curved back plate,
wherein the fixing member comprises a plurality of fixing portions configured to affix the fixing member to the curved back plate,
wherein the fixing member comprises a first side and a second side, a curvature of the first side is greater than a curvature of the second side, the plurality of the fixing portions are disposed on the first side and the second side respectively, and a density of the fixing portions on the first side is greater than a density of the fixing portions on the second side.

2. The electronic device as claimed in claim 1, further comprising a plurality of locking members, wherein the plurality of locking members pass through the fixing portions and connect to the curved back plate.

3. The electronic device as claimed in claim 1, wherein a plurality of first latch mechanisms are formed on the curved back plate, each of the fixing portions has a second latch mechanism, and the first latch mechanisms and the second latch mechanisms are engaged with each other.

4. The electronic device as claimed in claim 1, wherein the electronic device further comprises a plurality of locking members, the fixing portions on the first side are affixed to the curved back plate via the locking members, wherein a plurality of first latch mechanisms are formed on the curved back plate, each of the fixing portions on the second side has a second latch mechanism, and the fixing portions on the second side are affixed to the curved back plate via the first latch mechanisms and the second latch mechanisms.

5. The electronic device as claimed in claim 1, further comprising a plurality of locking members, wherein each of the fixing portions has a through hole corresponding to one of the locking members and a second latch mechanism corresponding to a first latch mechanism on the curved back plate.

6. The electronic device as claimed in claim 1, wherein a height of the protruding portion is greater than or equal to a height of the glue.

7. The electronic device as claimed in claim 1, wherein the display module comprises a cover plate and a display panel, a gap is formed between an edge of the display panel and an edge of the cover plate, and the glue adheres the cover plate inside the gap.

8. The electronic device as claimed in claim 7, wherein the glue and the fixing member are accommodated in the gap.

9. The electronic device as claimed in claim 7, wherein the display module further comprises an adhesive member disposed between the cover plate and the display panel, and a width of the adhesive member is less than a width of the cover plate.

10. The electronic device as claimed in claim 1, further comprising a plurality of fixing members, wherein each of the fixing members has a L-shaped structure.

11. The electronic device as claimed in claim 1, further comprising a plurality of fixing members, wherein each of the fixing members has a longitudinal structure.

12. The electronic device as claimed in claim 1, further comprising a plurality of fixing members, wherein one of the fixing members has a C-shaped structure, and another one of the fixing members has a longitudinal structure.

13. The electronic device as claimed in claim 1, wherein the fixing member comprises a first side, a second side, a fourth side, an extending section, and an additional extending section, the second side and the fourth side are connected to opposite ends of the first side, the extending section is connected to the second side and extends toward the fourth side, and the additional extending section is connected to the fourth side and extends toward the second side, wherein a gap is formed between the extending section and the additional extending section.

14. The electronic device as claimed in claim 13, wherein a circuit board of the curved backlight module or a circuit board of the display module is accommodated in the gap and separated from the extending section and the additional extending section.

15. The electronic device as claimed in claim 13, wherein a connecting portion between the first side and the second side includes an arc structure, and a connecting portion between the first side and the fourth side includes an arc structure.

16. A manufacturing method of an electronic device, comprising:
providing a curved backlight module, wherein the curved backlight module comprises a curved back plate with a first curvature;
providing a fixing member comprising at least one protruding portion; and
disposing a display module with a second curvature on the curved back plate by using the fixing member, wherein the first curvature is greater than the second curvature,
wherein the fixing member comprises a plurality of fixing portions configured to affix the fixing member to the curved back plate,
wherein the display module comprises an inner surface facing the curved backlight module, and the protruding portion is in contact with the inner surface,
wherein the fixing member comprises a first side and a second side, a curvature of the first side is greater than a curvature of the second side, the plurality of the fixing portions are disposed on the first side and the second side respectively, and a density of the fixing portions on the first side is greater than a density of the fixing portions on the second side.

17. The manufacturing method as claimed in claim 16, wherein the step of disposing a display module with a second curvature on the curved back plate by using the fixing member comprises:
providing a glue;
coating the glue on the display module;
pressing the fixing member onto the glue to adhere the fixing member to the display module; and
affixing the fixing member to the curved back plate.

18. The manufacturing method as claimed in claim 16, wherein the step of disposing a display module with a second curvature on the curved back plate by using the fixing member comprises:
providing a glue;
coating the glue on the fixing member;
pressing the fixing member with the glue onto the display module to adhere the fixing member to the display module; and
affixing the fixing member to the curved back plate.

* * * * *